United States Patent

Andreassen

Patent Number: 5,413,318
Date of Patent: May 9, 1995

[54] MEANS FOR DAMPING VIBRATIONS, FOR EXAMPLE SELF-GENERATED OSCILLATIONS IN BORING BARS AND SIMILAR

[75] Inventor: Lauritz Andreassen, Trondheim, Norway

[73] Assignee: Teeness AS, Trondheim, Norway

[21] Appl. No.: 107,707

[22] Filed: Aug. 19, 1993

[30] Foreign Application Priority Data

Feb. 21, 1991 [NO] Norway .................................. 910700

[51] Int. Cl.6 .............................................. F16F 7/00
[52] U.S. Cl. ................................... 267/140; 267/137; 188/379; 188/322.19; 173/211
[58] Field of Search ............... 408/143; 267/122, 125, 267/137, 138, 140.4, 141.2, 141.3, 293, 139, 140; 188/268, 379, 282, 285, 287, 312, 322.19; 173/210, 211, 162.1

[56] References Cited

U.S. PATENT DOCUMENTS

| | | | |
|---|---|---|---|
| 1,881,155 | 10/1932 | Weydert | 267/293 |
| 3,242,791 | 3/1966 | Smith | 188/379 |
| 3,287,998 | 11/1966 | Goernert et al. | 408/143 |
| 3,447,402 | 6/1969 | Ray | 77/58 |
| 3,486,585 | 12/1969 | Richter et al. | 188/379 |
| 3,559,512 | 2/1971 | Aggavawal | 408/143 |
| 3,598,498 | 8/1971 | Holmen | 408/143 |
| 3,774,730 | 11/1973 | Maddux | 188/379 |
| 3,838,936 | 10/1974 | Andreassen et al. | 408/143 |
| 4,385,665 | 5/1983 | Knoll | 188/379 |
| 4,408,668 | 10/1983 | Kühn et al. | 267/137 |
| 4,504,044 | 3/1985 | Shtarkman | 267/122 |
| 4,650,167 | 3/1987 | Steinev et al. | 267/137 |

FOREIGN PATENT DOCUMENTS

| | | |
|---|---|---|
| 0094557 | 11/1983 | European Pat. Off. . |
| 2142549 | 3/1973 | Germany . |
| 2942820 | 8/1984 | Germany . |
| 2302732 | 4/1985 | Germany . |
| 3418717 | 11/1985 | Germany . |
| 115824 | 12/1968 | Norway . |
| 118637 | 1/1970 | Norway . |
| 120609 | 11/1970 | Norway . |
| 128725 | 1/1974 | Norway . |
| 393760 | 5/1977 | Sweden . |
| 1179217 | 1/1970 | United Kingdom . |
| 1299750 | 12/1972 | United Kingdom . |

*Primary Examiner*—Robert J. Oberleitner
*Assistant Examiner*—Chris Schwartz
*Attorney, Agent, or Firm*—Keck, Mahin & Cate

[57] ABSTRACT

A damping device is constituted by a substantially cylindrical damper body (1) with an axial through bore (6), where the bore (6) accomodates a central pipe (3) which e.g. can lead a cooling liquid. The central pipe (3) is connected rigidly to or into the machine element to be damped, preferably in a cylindrical and axial cavity in a boring bar (9). Ring-shaped, elastic spring elements (2) placed in the ends of the damper body (1) and bewean the central pipe (3) and the damper body (1), as well as damping oil (4) in the clearance between the central pipe (3) and the damper body (1) transform motion energy into heat and provide the damping action. The stiffness of the spring elements (2) can optionally be adjusted.

7 Claims, 3 Drawing Sheets

MEANS FOR DAMPING VIBRATIONS, FOR EXAMPLE SELF-GENERATED OSCILLATIONS IN BORING BARS AND SIMILAR

BACKGROUND OF THE INVENTION

1. Field of the Invention

The present invention concerns a damping device which is particularly, however not exclusively, adapted for damping boring bars and similar toolholding bars which are used in machine tools. Typical applications for the invention are damping vibrations in boring bars used in metal cutting machining (turning, milling etc.), tools with extreme lengths in relation to tool diameter, or in machining on slender structural elements, slim shafts and so on. The self-generated vibrations or oscillations typically arise as a consequence of the dynamic stiffness of the toolholder, workpiece, or machine being too weak.

Similar types of damping devices are previously known, and a related device is disclosed in Norwegian Patent no. 128.725. This Norwegian patent relates to a damper body which necessarily must be placed in a bore in a boring bar, because the bore itself constitutes an essential part of the damping means, i.e. the damping effect is a result of an interaction between the damper body and the bore itself, via resilient elements located therebetween. Another related device is known from British Patent Specification No. 1,279,217, which patent shows a system where outside washers together with associated fixing elements etc., are fixedly connected to a damper body, and consequently will be forced to oscillate with the same frequency and amplitude as the damper body. Such an assembly will be prone to having problems at high speeds, due to the risk of opening of joints. Also, the assembly procedure seems too complicated with such a device. Furthermore, having one spring element in an end cutout of the damper body and one spring element external to the damper body, results in an asymmetrical configuration, which is unfortunate.

In modern machining in particular, as it is developing towards higher cutting speeds, resulting in higher temperatures at the cutting edge, there is a growing demand for tooling where the coolant can be lead all the way up to the cutting edge.

In damping of rotating components, it is most important that the damping device is able to tolerate a high velocity of rotation. For example, for rotating tools in modern machining, the development mentioned above means a very high velocity of rotation, and it is therefore of the greatest importance in these applications that the damping device by design can tolerate the highest velocity of rotation. This has been a problem when using the prior art damping devices.

Furthermore, usually the space for accomodating damping oil is, in the previously known damping systems, located between the damper body and a bore for the damper body inside the bulk of the boring bar. The volume of this space around the damper body can only be partially filled with oil, because if it is completely filled, the fluid will act on a much too big surface of the damper body, leading to a too heavy restriction on the movement of the damper body, and hence the damper device will not be able to provide the desired effect.

When forced to leave the above mentioned volume only partially filled with oil, one will experience that this causes functional problems of the prior art with partial or complete loss of damping effect if the distribution of the oil changes, for example when rotating the device, when altering the direction of the central axis of the damper out of a horizontal plane, or when there is variation in the directions in which the vibrations impinge onto the damping device.

Finally, with the damping oil in a partially filled volume outside the damper body, it will not be possible to change the damper body weight without also changing the volume of the oil space.

SUMMARY OF THE INVENTION

The present invention solves the above mentioned problem by providing a new damping device. The damping device in accordance with the invention is adapted to damp vibrations in objects like boring bars, toolholding bars, machine elements and also flat objects which can be exposed to undesired vibrations. The damping device comprises a substantially cylindrically shaped damper body to be placed in or on the object to be damped, and said damper body has an axial through bore and a cylindrical, central support which extends axially through said bore and which is rigidly connectable to the object to be damped. The novel damping device is characterized particularly by the fact that the damper body is connected to the central support via resilient spring elements placed in cutouts in each end of the damper body, said resilient spring elements being retained in place by means of washers located axially outside from the spring elements and rigidly connected to the central support, and also by the fact that the outer diameter of the central support is adapted to the bore diameter with a small clearance for accomodating damping oil.

In a preferred embodiment of the damping device in accordance with the invention, at least one of the washers is equipped with means for adjustable limitation of the expansion of the corresponding spring element, and thereby for adjusting the natural frequency of the damper body.

In such a case a preferred solution is that said at least one washer is two-part, an outer part being rigidly connectable to the central support and including a countersunk adjusting screw adapted to offset an inner part of the washer axially along the central support when turning the set screw, to obtain preload adjustment of the stiffness of the corresponding spring element.

In one embodiment of the invention the spring elements may comprise gas-filled rings of rubber or a plastic material.

In a preferred embodiment thereof, at least one of the spring elements is equipped with a nipple for adjusting the gas pressure, and thereby for adjusting the natural frequency of the damper body.

In a preferred embodiment of the invention, the cylindrical central support is hollow, i.e. constituting a pipe for e.g. conducting cooling liquid therethrough.

Thus, the present invention provides good opportunities, when it is used in a boring bar, regarding supplying a cooling fluid all the way up to the cutting edge of the boring bar, by the construction allowing the cooling fluid to be passed directly through the axial part of the damping device. This construction also allows that the same cavity in the boring bar now can accommodate a larger damper body, i.e. a larger damping mass than previously. This is because the gap between the damper body and the cavity wall can be reduced substantially, so that the diameter of the damper body is larger. Furthermore, in the present invention the spring elements are located "inside" the damper body, and therefore remove less mass from the damper body than in previously known constructions. And even more important: The accomodation space for damping oil is in the present invention merely a narrow, cylindrical gap between the damper body and the central support, and this feature together with the "inside" or central location of the spring elements, provide greater stability and larger freedom for dimensioning the parameters weight, gap width and spring constant independently from each other.

BRIEF DESCRIPTION OF THE DRAWINGS

The damping means in accordance with the invention shall now be described closer by means of embodiment examples, and with reference to the appended drawings, where FIGS. 2 and 2a and 2b show an embodiment of the damping device where its natural frequency is adjustable.

DESCRIPTION OF THE PREFERRED EMBODIMENTS

Figure 1A:
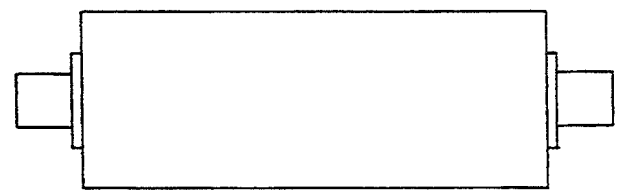
FIGS. 1a and 1b show the damping device in its simplest and most basic form.
Figure 1B:
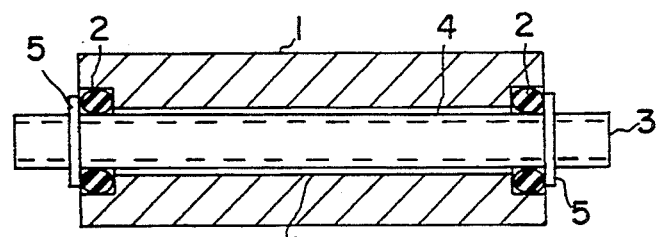

FIG. 1 discloses an example of a simple embodiment of the damping device in accordance with the invention. The substantially cylindrical damper body 1 is provided with a through axial bore 6. Inside said bore there is a central pipe 3 which quite generally is adapted to be secured rigidly with its outer ends inside a boring bar or to the object to be damped. The central pipe 3 is preferably adapted to lead a cooling fluid therethrough in communication with a duct leading further into the boring bar. In each outer end of the damper body 1 there is provided ring-shaped recesses containing ring-shaped spring elements 2, e.g. of rubber. The spring elements 2 constitute support elements between the central pipe 3 and the damper body 1. The spring elements 2 are held in place by adjustable washers 5, which are screwed on to the pipe 3 in order to provide a suitable spring constant in the spring elements 2 (refer in this connection to the discussion below regarding FIG. 6). Thus, when this damping device of the simplest type is mounted inside a boring bar, it is not possible to adjust the stiffnesses of the spring elements, and the natural frequency of the system is therefore constant. Therefore, this type of damping device is intended for use in e.g. short tools with a fixed overhang. A small clearance between the pipe 3, the body 1 and the spring elements 2 accommodates damping oil 4.

Figure 2A:
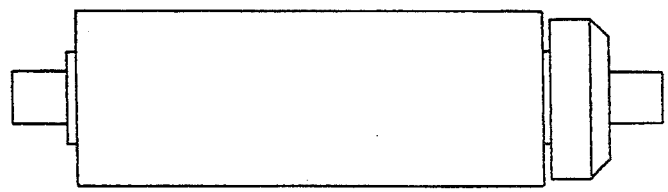
Figure 2B:
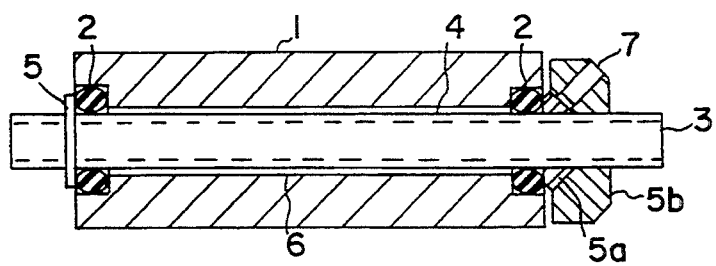

FIG. 2 discloses a damping device of somewhat more advanced type, i.e. this damping device is constructed in such a manner that the natural frequency can be adjusted from outside. Thus, this type of damping device is intended for use in e.g. tools with adjustable overhangs, and thereby connected varying natural frequency. In order to control the natural frequency of the damping device itself, at least one of the adjusting washers 5 is therefore constructed in two parts, see reference numerals 5a, 5b. The outer part 5b, which lies fixedly on pipe 3, is equipped with an adjusting screw 7 which when turned, displaces the inner part 5a of the adjusting washer axially inwards to and outwards from the spring element 2. This influences the stiffness of the spring element, and consequently also the natural frequency of the damping means.

Figure 3:
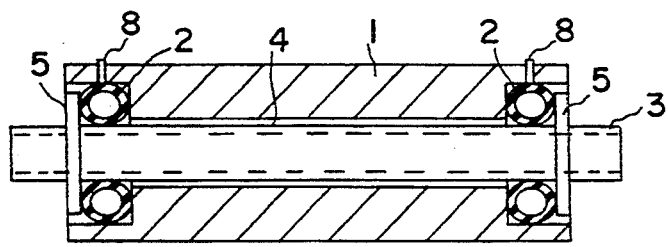
FIG. 3 shows an embodiment where the spring elements are air-filled rubber rings.

In a third embodiment which is disclosed in FIG. 3, the spring elements 2 are embodied as gas-filled rings, preferably made of rubber. Normally air will be used in the rings, which of course also can be manufactured from a plastic material with suitable characteristics as to resiliency and strength. For the rest the damping device has a construction corresponding to that which is shown in FIG. 1, except that the stiffness of the spring elements, and consequently the natural frequency of the damping device, is controlled by varying the gas pressure by means of nipples 8.

Figure 4:
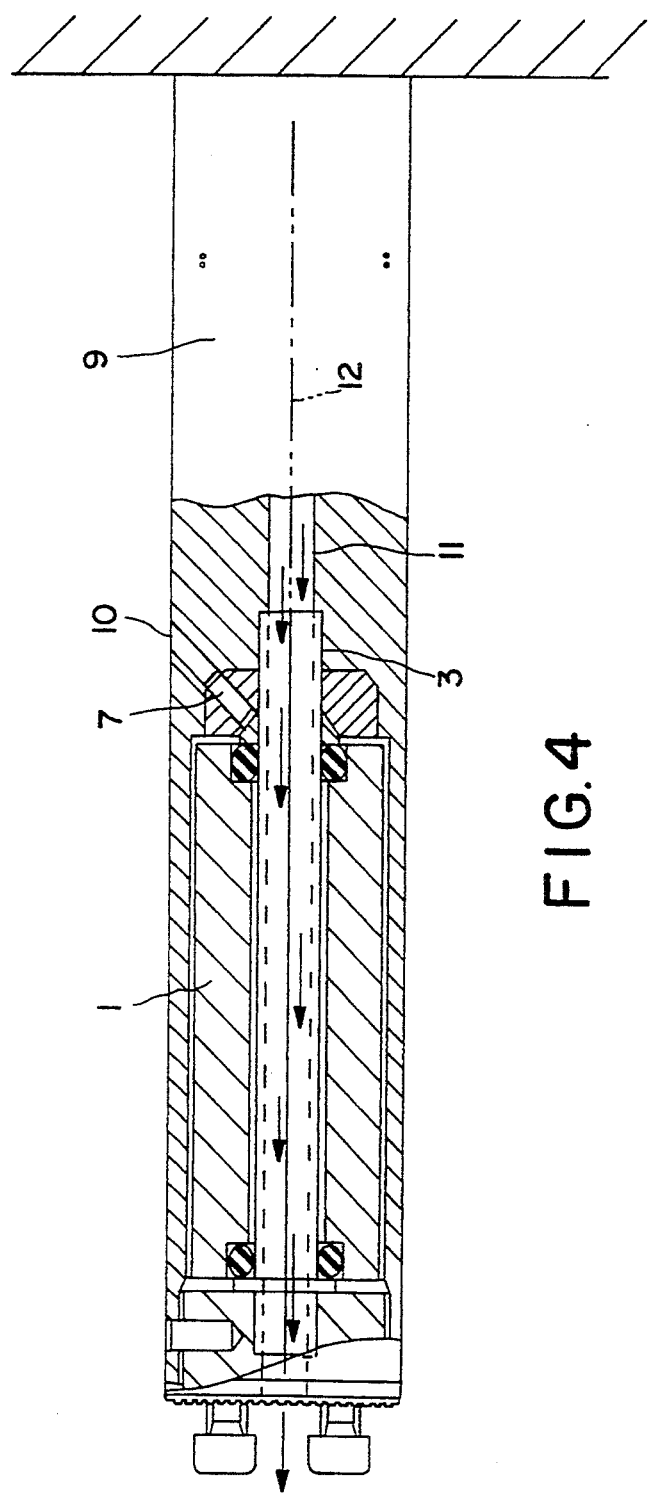
FIG. 4 shows a damper in accordance with FIG. 2, built into a boring bar.

In FIG. 4 is shown a damping device of the adjustable type shown in FIG. 2, built into a boring bar 9. As shown in the drawing, the boring rod 9 has a cooling duct 11 in direct communication with the central pipe 3, and these are aligned along the boring bar axis 12. Through an opening 10 in the boring rod there is access to the adjusting screw 7 for adjusting the natural frequency of the damping device.

Figure 5A:
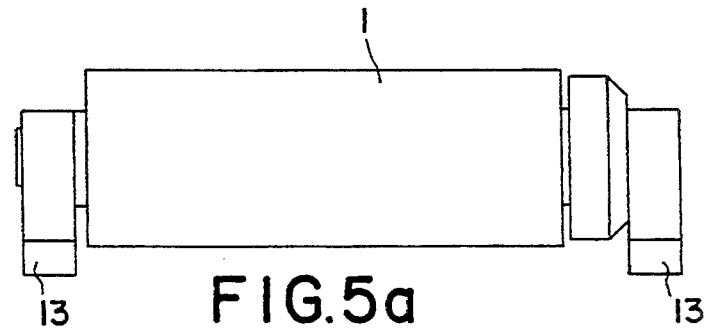
FIGS. 5a and 5b show a mounting mode for the damping device when it is to be placed on a flat object which should be damped.
Figure 5B:
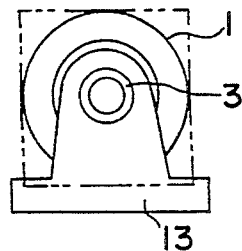

It is also possible to use the damping device in accordance with the invention for outside damping of e.g. a flat object, and in FIG. 5 is shown a mounting means intended for such use. The central pipe 3 is then used as a support in two brackets 13 which in their turn are mounted rigidly to the body to be damped. For the rest, the damping device has the same construction as in FIG. 2.

Figure 6:
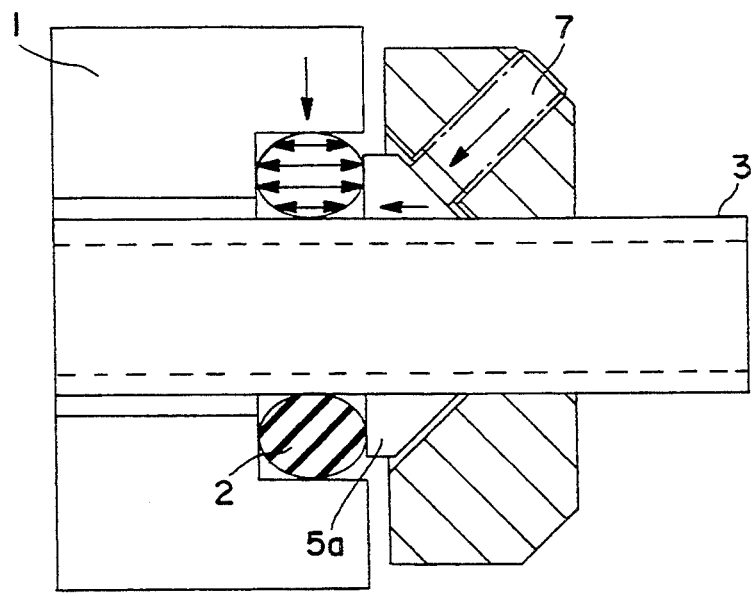
FIG. 6 shows a detail study regarding adjusting the natural frequency.

FIG. 6 illustrates in closer detail how to achieve the adjustment of the stiffness of the spring element in the embodiment shown in FIG. 2. It appears clearly that when screwing the adjusting screw 7 inwards, the inner part 5a of the adjusting washer is displaced in towards the spring element 2, and thereby limits the possibility of an expansion of the spring element in a direction along the central pipe 3. When the damper body 1 moves as shown with an arrow, the spring element 2 can then not be deformed out along the pipe 3 to the same extent as previously. In effect the spring constant of the spring element is changed thereby, and such a change of spring constant has a direct influence on the natural frequency of the oscillating system (the mass of the damper body on spring element 2).

When using gas-filled spring elements, as shown in FIG. 3, the spring constant can also be adjusted by increasing or decreasing the air pressure in the rings, but access to the ring nipples must then be provided.

In general the damping device operates in the following manner:

When the construction to be damped, e.g. the boring bar, is set in motion due to influence connected with the cutting force, some part of this motion will be transferred via the spring elements to the mass of the damper body. Motion (energy) which is not transferred from the bar through the central pipe and via the spring elements to the damper body, is transformed into heat energy in the spring elements and in the damping oil. Heat is generated by internal friction in the damping oil and in the spring elements, as well as in the various boundary surfaces. In continuous operation a typical oscillating motion appears, and the boring bar and the damper body will substantially move with the same frequency, however the progress of phase and acceleration will be a little different. The phase difference will cause the necessary deformation/friction in spring elements and damping oil, thereby providing loss of energy in the form of heat development. Thereby also the acceleration of bar and damper body will be different, and the damping force will be directly related to this difference.

I claim:

1. A damping device for objects which can be exposed to undesired vibrations, comprising:
   a substantially cylindrically shaped damper body, said damper body having a pair of ends having cutouts formed therein and an axial through bore;
   a cylindrical, central support extending axially through said axial through bore and rigidly connected to an object to be damped;
   resilient spring elements placed in said cutouts in the ends of said damper body for connecting said damper body to said central support; and
   washers located axially outside of said spring elements and rigidly connected to said central support, said central support having an outer diameter defining a small clearance between said central support and a surface of said axial through bore for accommodating damping oil.

2. Damping device in accordance with claim 1, wherein said resilient spring elements are ring-shaped and lie in ring-shaped cutouts in said damper body immediately adjacent to said axial through bore.

3. Damping device in accordance with claim 1, wherein at least one of said washers is equipped with adjustable means for limiting expansion of one of the spring elements, thereby permitting adjustment of the natural frequency of said damper body.

4. Damping device in accordance with claim 3, wherein at least one of said washers is a two-part washer, an outer part of said two-part washer being rigidly connectable onto said central support and comprising a countersunk adjusting screw adapted, when turned, to offset an inner part of said at least one of said washers axially along said central support to obtain preload stiffness adjustment of a corresponding spring element.

5. Damping device in accordance with claim 1, wherein the spring elements are gas-filled rights of at least one of rubber and plastic materials.

6. Damping device in accordance with claim 5, wherein at least one of said spring elements is equipped with a nipple for adjusting gas pressure, and thereby the natural frequency of said damper body.

7. Damping device in accordance with claim 1, wherein the cylindrical, central support is hollow and forms a pipe for conducting fluid therethrough.

* * * * *